United States Patent
Vittorias et al.

(10) Patent No.: US 9,512,308 B2
(45) Date of Patent: *Dec. 6, 2016

(54) POLYETHYLENE COMPOSITION HAVING HIGH SWELL RATIO

(71) Applicant: Basell Polyolefine GmbH, Wesseling (DE)

(72) Inventors: Iakovos Vittorias, Mainz (DE); Jens Wiesecke, Zwingenberg (DE); Bernd Lothar Marczinke, Frankfurt (DE); Gerhardus Meier, Frankfurt (DE); Ulf Schüller, Frankfurt (DE); Volker Dolle, Bensheim (DE); Johannes-Friedrich Enderle, Frankfurt (DE); Dieter Lilge, Limburgerhof (DE); Barbara Gall, Günzburg (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,022

(22) Filed: Apr. 27, 2016

(65) Prior Publication Data

US 2016/0237265 A1  Aug. 18, 2016

Related U.S. Application Data

(63) Continuation of application No. 14/437,456, filed as application No. PCT/EP2013/071998 on Oct. 22, 2013, now Pat. No. 9,353,206.

(Continued)

(30) Foreign Application Priority Data

Oct. 22, 2012 (EP) .................................. 12189392
Nov. 28, 2012 (EP) .................................. 12194526

(51) Int. Cl.
*C08L 23/06* (2006.01)
*C08L 23/04* (2006.01)
(Continued)

(52) U.S. Cl.
CPC .............. *C08L 23/06* (2013.01); *C08F 210/16* (2013.01); *C08J 5/00* (2013.01); *C08L 23/0815* (2013.01);
(Continued)

(58) Field of Classification Search
CPC ............ C08F 2/001; C08L 23/06; C08L 23/08
See application file for complete search history.

(56) References Cited

U.S. PATENT DOCUMENTS 6,201,078 B1 * 3/2001 Breulet ................... C08F 10/00
525/240
8,129,472 B2   3/2012 Turner et al.
9,023,945 B2 * 5/2015 Mavridis ................. C08L 23/06
525/240

FOREIGN PATENT DOCUMENTS

RU        2444546 C2    3/2012
WO   WO 2005/019290 A1 *  3/2005  ................ C08F 2/38

* cited by examiner

*Primary Examiner* — Fred M Teskin

(57) ABSTRACT

The present disclosure relates to a polyethylene composition with improved swell ratio and mechanical properties, particularly suited for preparing blow-moulded articles, said composition having the following features:
1) a density from 0.952 to 0.960 g/cm$^3$;
2) an MIF/MIP ratio from 17 to 30; and
3) a Shear-Induced Crystallization Index SIC from 2.5 to 5.0.

7 Claims, 1 Drawing Sheet

Related U.S. Application Data

(60) Provisional application No. 61/730,919, filed on Nov. 28, 2012.

(51) Int. Cl.
*C08F 2/34* (2006.01)
*C08F 210/16* (2006.01)
*C08L 23/08* (2006.01)
*C08J 5/00* (2006.01)
*B01J 8/18* (2006.01)
*B29C 49/00* (2006.01)

(52) U.S. Cl.
CPC ............ *B29C 49/00* (2013.01); *C08J 2323/06* (2013.01); *C08J 2323/08* (2013.01); *C08J 2423/06* (2013.01); *C08J 2423/08* (2013.01); *C08L 2205/025* (2013.01); *C08L 2308/00* (2013.01); *C08L 2314/02* (2013.01)

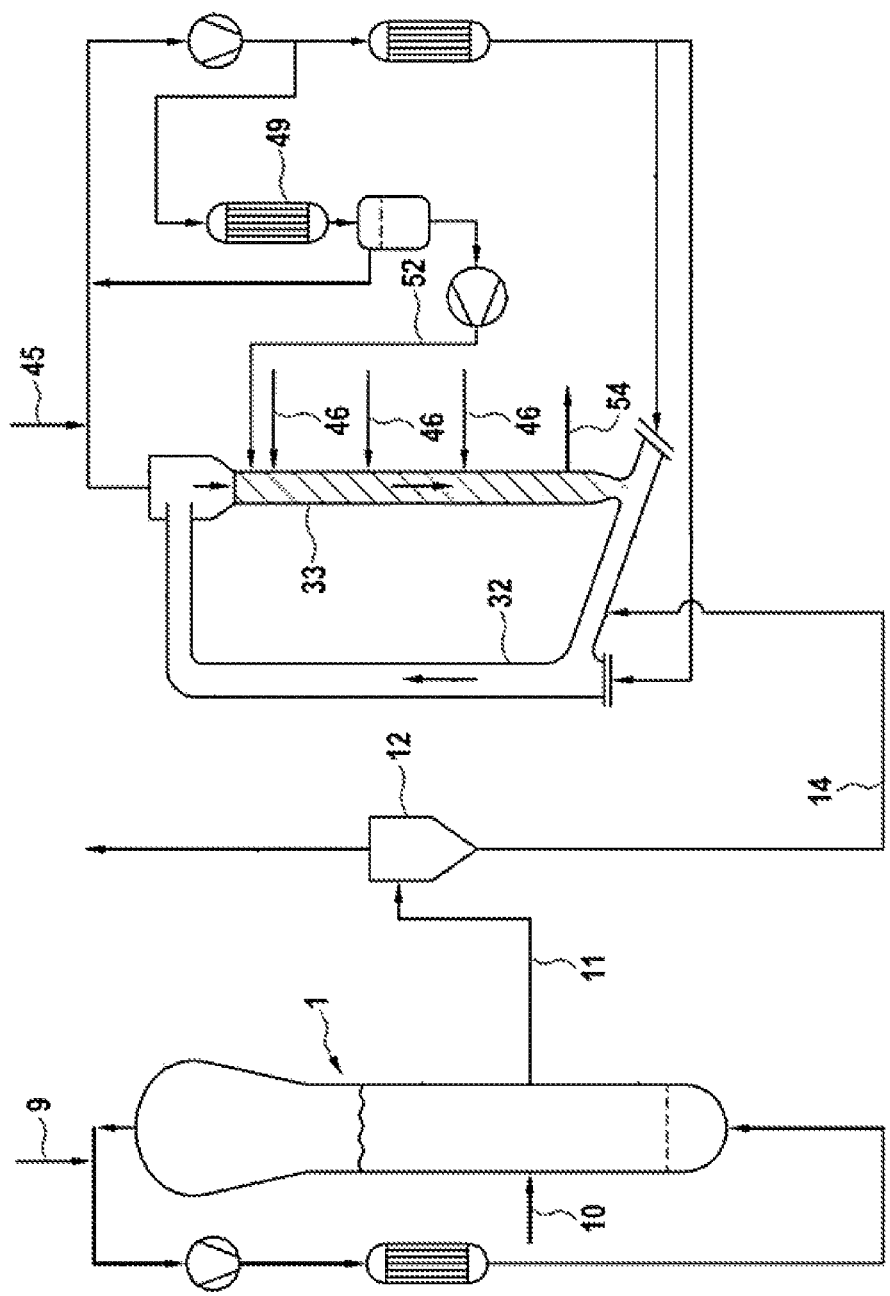

POLYETHYLENE COMPOSITION HAVING HIGH SWELL RATIO

CROSS-REFERENCE TO RELATED APPLICATIONS

This application is a Continuation Application of co-pending U.S. patent application Ser. No. 14/437,456, filed Apr. 21, 2015 and issued on May 31, 2016 as U.S. Pat. No. 9,353,206, which is the U.S. National Phase of PCT International Application PCT/EP2013/071998, filed Oct. 22, 2013, claiming benefit of priority to European Patent Application No. 12189392.9, filed Oct. 22, 2012, European Patent Application No. 12194526.5, filed Nov. 28, 2012, and claiming benefit of priority under 35 U.S.C. §119(e) of U.S. Provisional Application No. 61/730,919, filed Nov. 28, 2012, the contents of which are incorporated herein by reference in their entirety.

FIELD OF THE INVENTION

The present disclosure provides for a polyethylene composition suitable for preparing various kinds of formed articles. In particular, due to its enhanced processability, high die-swell with high-quality surface and dimension stability of final article, environmental stress cracking resistance (FNCT) and impact resistance, the present composition is suitable for making extrusion blow-molded hollow articles, such as drums, containers and gasoline storage tanks. The present disclosure also relates to a multi-stage polymerization process for preparing the polyethylene composition.

BACKGROUND OF THE INVENTION

An additional and important advantage of the polyethylene composition of the present disclosure is that it can be melt-processed at unusually high shear rate values, which mean high processing speeds and/or reduced melt-processing temperatures, without encountering flow-instabilities which generally produce unacceptable defects in the formed articles (e.g. shark skin or melt-fracture), even in the absence of processing aids.

Moreover, the fast crystallization kinetics of the present composition, which provides a critical contribution to its superior process-ability, also provides an unusually reduced shrinkage of the formed articles, thus allowing achieving a remarkable dimensional stability.

Thus the composition of the present invention provides an unmatched balance of mechanical properties and process-ability with respect to the known polyethylene compositions for the same use, as disclosed in U.S. Pat. No. 6,201,078.

In fact, the problem of achieving a high impact resistance, reducing the flow-instabilities and improving the dimensional stability (lowering shrinkage) is not mentioned in the document.

SUMMARY OF THE INVENTION

In some embodiments, the present disclosure provides a polyethylene composition having the following features:

1) a density from 0.952 to 0.960 g/cm$^3$, including from 0.953 to 0.960 g/cm$^3$, determined according to ISO 1183 at 23° C.;

2) a MIF/MIP ratio from 17 to 30, such as from 17 to 29, where MIF is the melt flow index at 190° C. with a load of 21.60 kg, and MIP is the melt flow index at 190° C. with a load of 5 kg, both determined according to ISO 1133;

3) a SIC Index from 2.5 to 5.0, such as from 2.5 to 4.5 and from 3.2 to 3.9;

wherein the SIC Index is the Shear-Induced Crystallization Index, determined according to the following relation:

$$\text{SIC Index}=(t_{onset,SIC}@1000 \times t_{onset,quiescent})/((HLMI)*100)$$

where $t_{onset,SIC}@1000$ is measured in seconds and is the time required for a crystallization onset under a shear rate of 1000 s$^{-1}$, the $t_{onset,\ quiescent}$ is an measured in seconds and is the crystallization onset time at a temperature of 125° C. under no shear, determined in isothermal mode by differential scanning calorimetry (DSC); and HLMI is the melt flow index determined at 190° C. with a load of 21.6 kg, according to ISO 1133.

BRIEF DESCRIPTION OF THE DRAWINGS

These and other features, aspects, and advantages of the present disclosure will become better understood with reference to the following description and appended claims, and accompanying drawing FIGURE where:

The drawing is an illustrative embodiment of a simplified process-flow diagram of two serially connected gas-phase reactors suitable for use in accordance with various embodiments of ethylene polymerization processes disclosed herein to produce various embodiments of the polyethylene compositions disclosed herein.

It should be understood that the various embodiments are not limited to the arrangements and instrumentality shown in the drawing FIGURE.

DETAILED DESCRIPTION OF THE INVENTION

The expression "polyethylene composition" is intended to embrace, as alternatives, both a single ethylene polymer and an ethylene polymer composition, such as a composition of two or more ethylene polymer components, including polymer components with different molecular weights, wherein such a composition is also called "bimodal" or "multimodal" polymer in the relevant art.

Typically the polyethylene composition of the present disclosure consists of or comprises one or more ethylene copolymers.

All the features herein defined, comprising the previously defined features 1) to 3), are referred to the ethylene polymer or ethylene polymer composition. The addition of other components, like the additives normally employed in the art, can modify one or more of the compositional features.

The ratio MIF/MIP provides a rheological measure of molecular weight distribution.

Another measure of the molecular weight distribution is provided by the ratio Mw/Mn, where Mw is the weight average molar mass and Mn is the number average molar mass, both measured by GPC (Gel Permeation Chromatography), as explained in the examples.

In some embodiments, Mw/Mn values for the polyethylene composition of the present disclosure range from 15 to 25.

Moreover, the polyethylene composition of the present disclosure has, in some embodiments, at least one of the following additional features.

a Mw equal to or greater than 250000 g/mol, such as equal to or greater than 280000 g/mol, or equal to or greater than 300000 g/mol;

a Long Chain Branching index (LCB) determined as described in the examples, equal to or greater than 0.70, including equal to or greater than 0.72, and equal to or greater than 0.78;

MIP: 0.05-0.5 g/10 min.;

MIF: 1-15 g/10 min.;

a comonomer content of equal to or less than 1% by weight, such as from 0.05 to 1% by weight, with respect to the total weight of the composition.

The comonomer or comonomers present in the ethylene copolymers are generally selected from olefins having the general formula $CH_2=CHR$, wherein R is an alkyl radical, linear or branched, having from 1 to 10 carbon atoms.

Specific examples are propylene, butene-1, pentene-1,4-methylpentene-1, hexene-1, octene-1 and decene-1.

In particular, in one embodiment, the present composition comprises:

A) 40-60% by weight of an ethylene homopolymer or copolymer (the homopolymer being preferred) with density equal to or greater than 0.960 g/cm$^3$ and melt flow index MIE (190° C./2.16 kg, according to ISO 1133) of 2-30 g/10 min.;

B) 40-60% by weight of an ethylene copolymer having a MIE value lower than the MIE value of A), including lower than 0.5 g/10 min.

The above percent amounts are given with respect to the total weight of A)+B).

The amount of comonomer in B) is, in some embodiments, from 0.1 to 2% by weight, with respect to the total weight of B).

As previously said, the present polyethylene composition can be advantageously used in the preparation of extrusion blow-molded hollow articles, in particular large blow molded articles such as open-top drums, due to its valuable mechanical properties.

In fact, in certain embodiments the composition is characterized by the following properties:

a FNCT equal to or greater than 30 hours, measured at 4 MPa, 80° C.;

a Notch Tensile Impact (−30° C.) equal to or greater than 100 kJ/m$^2$;

a critical shear-rate for shark skin (190° C.) equal to or greater than 250 s$^{-1}$;

a die swell-ratio equal to or greater than 150%;

a shrinkage percentage at 1500 s$^{-1}$ (190° C.) equal to or smaller than 17%.

The details of the test methods are given in the examples.

In particular, the shark skin test (critical shear rate for shark skin) provides an indication of the shear rate at which flow instabilities start due to pressure oscillations, thus of the melt processing conditions, and consequently of the extrusion throughput, at which irregularities on the surface of the extruded piece become visible. Such irregularities strongly reduce surface gloss and smoothness, thereby lowering the quality of the extruded article to an unacceptable level.

As previously mentioned, the polyethylene composition of the present disclosure can be melt-processed at surprisingly high values of shear rate, still without undergoing pressure oscillations and flow instabilities.

While no necessary limitation is known to exist in principle on the kind of polymerization processes and catalysts to be used, it has been found that the polyethylene composition of the present disclosure can be prepared by a gas phase polymerization process in the presence of a Ziegler-Natta catalyst.

A Ziegler-Natta catalyst comprises the product of the reaction of an organometallic compound of Group 1, 2 or 13 of the Periodic Table of Elements with a transition metal compound of Groups 4 to 10 of the Periodic Table of Elements (new notation). In particular, the transition metal compound can be selected from among compounds of Ti, V, Zr, Cr and Hf and may be supported on MgCl$_2$.

Catalysts for use in the present technology comprise the product of the reaction of the organometallic compound of Group 1, 2 or 13 of the Periodic Table of Elements, with a solid catalyst component comprising a Ti compound and an electron donor compound (ED) supported on MgCl$_2$.

In some embodiments, the organometallic compounds are the organo-Al compounds.

In one embodiment, the polyethylene composition of the present disclosure is obtainable by using a Ziegler-Natta polymerization catalyst, such as a Ziegler-Natta catalyst supported on MgCl$_2$ or a Ziegler-Natta catalyst comprising the product of reaction of:

a) a solid catalyst component comprising a Ti compound and an electron donor compound (ED) supported on MgCl$_2$;

b) an organo-Al compound; and optionally c) an external electron donor compound (ED$_{ext}$).

In some embodiments, in component a) the ED/Ti molar ratio ranges from 1.5 to 3.5 and the Mg/Ti molar ratio is higher than 5.5, such as from 6 to 80.

Suitable titanium compounds for use in the present technology are the tetrahalides or the compounds of formula $TiX_n(OR^1)_{4-n}$, where $0 \leq n \leq 3$, X is halogen, such as chlorine, and $R^1$ is $C_1$-$C_{10}$ hydrocarbon group. Titanium tetrachloride is used in some embodiments.

In certain embodiments, the ED compound is generally selected from alcohols, ketones, amines, amides, nitriles, alkoxysilanes, aliphatic ethers, and esters of aliphatic carboxylic acids The inventors have found that excellent results may been obtained with the use of esters as the ED compound. Specific examples of esters are the alkyl esters of $C_1$-$C_{20}$ aliphatic carboxylic acids, including $C_1$-$C_8$ alkyl esters of aliphatic mono carboxylic acids such as ethylacetate, methyl formiate, ethylformiate, methylacetate, propylacetate, i-propylacetate, n-butylacetate and i-butylacetate. Moreover, aliphatic ethers and the $C_2$-$C_{20}$ aliphatic ethers, such as tetrahydrofurane (THF) or dioxane may be used in the present technology.

In the solid catalyst component described herein the MgCl$_2$ is the basic support, while minor amount of additional carriers can also be used. The MgCl$_2$ can be used as such or obtained from Mg compounds used as precursors that can be transformed into MgCl$_2$ by their reaction with halogenating compounds. The use of MgCl$_2$ in active form is known from the patent literature as a support for Ziegler-Natta catalysts. For instance, U.S. Pat. Nos. 4,298,718 and 4,495,338 were the first to describe the use of these compounds in Ziegler-Nana catalysis. It is known from these patents that the magnesium dihalides in active form may be used as supports or co-supports in components of catalysts for the polymerization of olefins. These compounds may be characterized by X-ray spectra, in which the most intense diffraction line that appears in the ASTM-card reference of the spectrum of the non-active halide is diminished in intensity and broadened. In the X-ray spectra of magnesium dihalides in active form, the most intense line is diminished in intensity and replaced by a halo whose maximum intensity is displaced towards lower angles relative to that of the most intense diffraction line.

In some embodiments, the preparation of the polyethylene composition of the present disclosure may be performed using catalysts wherein the solid catalyst component a) is obtained by first contacting the titanium compound with the $MgCl_2$, or a precursor Mg compound, optionally in the presence of an inert medium, thus preparing an intermediate product a') containing a titanium compound supported on $MgCl_2$, in which the intermediate product a') is then contacted with the ED compound which is added to the reaction mixture alone or in a mixture with other compounds and represents the main component, optionally in the presence of an inert medium.

With the term "main component," we intend that the ED compound is generally the main component in terms of molar amount, with respect to the other possible compounds excluding inert solvents or diluents used to handle the contact mixture. The ED treated product can then be subject to washings with the proper solvents in order to recover the final product. If needed, the treatment with the ED compound can be repeated one or more times.

As previously mentioned, a precursor of $MgCl_2$ can be used as the starting Mg compound. This can be selected, for example, from among Mg compounds of the general formula $MgR'_2$ where the R' groups can be independently $C_1$-$C_{20}$ hydrocarbon groups that are optionally substituted, OR groups, OCOR groups, chlorine, in which R is a $C_1$-$C_{20}$ hydrocarbon group optionally substituted, such that the R' groups are not simultaneously chlorine. Also suitable as precursors are the Lewis adducts between $MgCl_2$ and suitable Lewis bases. A class of compounds for use in the present technology is constituted by the $MgCl_2$ (R"OH)$_m$ adducts, in which R" groups are $C_1$-$C_{20}$ hydrocarbon groups, such as $C_1$-$C_{10}$ alkyl groups, and m is from 0.1 to 6, including from 0.5 to 3 and from 0.5 to 2. Adducts of this type can generally be obtained by mixing alcohol and $MgCl_2$ in the presence of an inert hydrocarbon immiscible with the adduct and operating under stirring conditions at the melting temperature of the adduct (100-130° C.). The emulsion is quickly quenched, thereby causing the solidification of the adduct in the form of spherical particles. Representative methods for the preparation of these spherical adducts are reported, for example, in U.S. Pat. Nos. 4,469,648 and 4,399,054, and WIPO Pat. App. Pub. No. WO98/44009. Another potential method for spherulization in accordance with the present technology is the spray cooling method described, for example, in U.S. Pat. Nos. 5,100,849 and 4,829,034.

In some embodiments, $MgCl_2$.(EtOH)$_m$ adducts in which m is from 0.15 to 1.7 obtained by subjecting the adducts to a higher alcohol content and a thermal dealcoholation process carried out in nitrogen flow at temperatures comprised between 50 and 150° C. until the alcohol content is reduced to the above value may be used. A process of this type is described in EP Pat. No. 395083.

The dealcoholation can also be carried out chemically by contacting the adduct with compounds capable to react with the alcohol groups.

Generally these dealcoholated adducts are also characterized by a porosity (measured by mercury method) due to pores with radius up to 0.1 µm ranging from 0.15 to 2.5 $cm^3$/g preferably from 0.25 to 1.5 $cm^3$/g.

In some embodiments, the dealcoholation reaction is carried out simultaneously with a reaction involving the use of a titanium compound. Accordingly, these adducts are reacted with the $TiX_n(OR^1)_{4-n}$ compound (or possibly mixtures thereof) mentioned above, such as titanium tetrachloride. The reaction with the Ti compound can be carried out by suspending the adduct in $TiCl_4$ (generally, under cold conditions). The mixture is heated up to temperatures ranging from 80-130° C. for 0.5-2 hours. The treatment with the titanium compound can be carried out one or more times, including twice. It can also be carried out in the presence of an electron donor compound such as those mentioned above. At the end of the process the solid is recovered by separation of the suspension via conventional methods (such as settling and removing of the liquid, filtration, centrifugation) and can be subjected to washings with solvents. Although the washings are typically carried out with inert hydrocarbon liquids, it is also possible to use more polar solvents (having, for example, a higher dielectric constant) such as halogenated hydrocarbons.

As mentioned above, the intermediate product is then brought into contact with the ED compound under conditions able to fix onto the solid an effective amount of electron donor. Due to the high versatility of this method, the amount of donor used can widely vary. As an example, it can be used in a molar ratio with respect to the Ti content in the intermediate product ranging from 0.5 to 20, such as from 1 to 10. In some embodiments, the contact is carried out in a liquid medium such as a liquid hydrocarbon. The temperature at which the contact takes place can vary depending on the nature of the reagents, including in a range from −10-150° C. and from 0-120° C. Temperatures capable of causing the decomposition or degradation of any specific reagents should be avoided, even if they fall within the generally suitable range. Also, the time of the treatment can vary depending on other conditions such as nature of the reagents, temperature, concentration, etc. Generally, this contact step can last from 10 minutes to 10 hours, such as from 0.5 to 5 hours. If desired, in order to further increase the final donor content, this step can be repeated one or more times. At the end of this step, the solid is recovered by separation of the suspension via conventional methods (such as settling and removing of the liquid, filtration, centrifugation) and can be subject to washings with solvents. Although the washings are typically carried out with inert hydrocarbon liquids, it is also possible to use more polar solvents (having, for example, a higher dielectric constant) such as halogenated or oxygenated hydrocarbons.

As previously mentioned, the solid catalyst component is converted into a catalyst for the polymerization of olefins by reacting it, according to known methods, with an organometallic compound of Group 1, 2 or 13 of the Periodic Table of Elements, such as with an Al-alkyl compound.

The alkyl-Al compound is, in certain embodiments, chosen from among the trialkyl aluminum compounds, such as triethylaluminum, triisobutylaluminum, tri-n-butylaluminum, tri-n-hexylaluminum and tri-n-octylaluminum. It is also possible to use alkylaluminum halides, alkylaluminum hydrides and alkylaluminum sesquichlorides such as $AlEt_2Cl$ and $Al_2Et_3Cl_3$, optionally in a mixture with the trialkyl aluminum compounds.

The external electron donor compound $ED_{ext}$ optionally used to prepare the said Ziegler-Natta catalysts can be equal to or different from the ED used in the solid catalyst component a) and may be selected from the group consisting of ethers, esters, amines, ketones, nitriles, silanes and mixtures thereof. In some embodiments, the $ED_{ext}$ is selected from $C_2$-$C_{20}$ aliphatic ethers and cyclic ethers having 3-5 carbon atoms such as tetrahydrofuran and dioxane.

Specific examples of the above described Ziegler-Natta catalysts and methods for their preparation are provided in WIPO Pat. App. Pub. No. WO2004106388. However, the polyethylene composition of the present disclosure is obtainable by a process wherein all the polymerization steps are carried out in the presence of the catalyst.

It has been found that by using the polymerization catalyst described herein, the polyethylene composition of the present disclosure can be prepared in a process comprising the following steps, in any mutual order:

a) polymerizing ethylene, optionally together with one or more comonomers, in a gas-phase reactor in the presence of hydrogen; and b) copolymerizing ethylene with one or more comonomers in another gas-phase reactor in the presence of an amount of hydrogen less than that in step a);

where in at least one of said gas-phase reactors the growing polymer particles flow upward through a first polymerization zone (riser) under fast fluidization or transport conditions, leave the riser and enter a second polymerization zone (downcomer) through which they flow downward under the action of gravity, leave the downcomer and are reintroduced into the riser, establishing a circulation of polymer between two polymerization zones.

In the first polymerization zone (riser), fast fluidization conditions are established by feeding a gas mixture comprising one or more olefins (ethylene and comonomers) at a velocity higher than the transport velocity of the polymer particles. The velocity of the gas mixture is, in some embodiments, between 0.5 and 15 m/s, such as between 0.8 and 5 m/s. The terms "transport velocity" and "fast fluidization conditions" are well known in the art; see, for example, "D. Geldart, *Gas Fluidisation Technology*, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer.

The polymer therefore flows vertically down through the downcomer in a plug flow (packed flow mode), so that only small quantities of gas are entrained between the polymer particles.

Such processes allow one to obtain from step a) an ethylene polymer with a molecular weight that is lower than the ethylene copolymer obtained from step b).

The polymerization of ethylene to produce a relatively low molecular weight ethylene polymer (step a) is performed, in certain embodiments, upstream of the copolymerization of ethylene with a comonomer to produce a relatively high molecular weight ethylene copolymer (step b). In step a) a gaseous mixture comprising ethylene, hydrogen and an inert gas may therefore be fed to a first gas-phase reactor, such as a gas-phase fluidized bed reactor. The polymerization is carried out in the presence of the previously described Ziegler-Natta catalyst, wherein no comonomer is fed to the first gas phase reactor and a highly crystalline ethylene homopolymer is obtained in step a). However, a minimal amount of comonomer may be fed under conditions such that the degree of copolymerization in step a) is limited so that the density of the ethylene polymer obtained in step a) is not less than 0.960 g/cm$^3$.

Hydrogen is fed in an amount depending on the specific catalyst used and, in any case, in an amount suitable to obtain in step a) an ethylene polymer with a melt flow index (MIE) from 2 to 30 g/10 min. In order to obtain the MIE range, in step a) the hydrogen/ethylene molar ratio is from 0.3 to 2 and the amount of ethylene monomer is from 5 to 50% by volume, such as from 5 to 30% by volume, based on the total volume of gas present in the polymerization reactor. The remaining portion of the feeding mixture is represented by inert gases and one or more comonomers, if any. Inert gases which are necessary to dissipate the heat generated by the polymerization reaction are conveniently selected from nitrogen or saturated hydrocarbons, such as propane.

The operating temperature in the reactor of step a) is selected between 50 and 120° C., such as between 65 and 100° C. 0.5 and 10 MPa, preferably between 2.0 and 3.5 MPa.

In one embodiment, the ethylene polymer obtained in step a) represents from 40 to 60% by weight of the total ethylene polymer produced in the overall process, i.e. in the first and second serially connected reactors.

The ethylene polymer coming from step a) and the entrained gas are then passed through a solid/gas separation step, in order to prevent the gaseous mixture coming from the first polymerization reactor from entering the reactor of step b) (second gas-phase polymerization reactor). The gaseous mixture can be recycled back to the first polymerization reactor, while the separated ethylene polymer is fed to the reactor of step b). A suitable point of feeding of the polymer into the second reactor is on the connecting part between the downcomer and the riser, wherein the solid concentration is particularly low, so that the flow conditions are not negatively affected.

The operating temperature in step b) is in the range of 65 to 95° C., and the pressure is in the range of 1.5 to 4.0 MPa. The second gas-phase reactor is aimed to produce a relatively high molecular weight ethylene copolymer by copolymerizing ethylene with one or more comonomers. Furthermore, in order to broaden the molecular weight distribution of the final ethylene polymer, the reactor of step b) can be conveniently operated by establishing different conditions of monomers and hydrogen concentration within the riser and the downcomer.

In step b) the gas mixture entraining the polymer particles and coming from the riser can be partially or totally prevented from entering the downcomer for obtaining two different gas composition zones. This can be achieved by feeding a gas and/or a liquid mixture into the downcomer through a line placed at a suitable point of the downcomer, such as in the upper part. The gas and/or liquid mixture should have a suitable composition, different from that of the gas mixture present in the riser. The flow of gas and/or liquid mixture can be regulated so that an upward flow of gas countercurrent to the flow of the polymer particles is generated, such as at the top thereof, acting as a barrier to the gas mixture entrained among the polymer particles coming from the riser. In some embodiments, it may be advantageous to feed a mixture with low content of hydrogen in order to produce the higher molecular weight polymer fraction in the downcomer. One or more comonomers can be fed to the downcomer of step b), optionally together with ethylene, propane or other inert gases.

The hydrogen/ethylene molar ratio in the downcomer of step b) is between 0.005 and 0.2, the ethylene concentration may be from 1 to 20%, such as 3-10%, by volume, and the comonomer concentration may be from 0.05 to 0.8% by volume, based on the total volume of gas present in said downcomer. The rest is propane or similar inert gases. Since a very low molar concentration of hydrogen is present in the downcomer, by carrying out the process of the present disclosure it is possible to bond a relatively high amount of comonomer to the high molecular weight polyethylene fraction.

The polymer particles coming from the downcomer are reintroduced in the riser of step b).

Since the polymer particles keep reacting and no more comonomer is fed to the riser, the concentration of the comonomer drops to a range of 0.01 to 0.2% by volume, based on the total volume of gas present in the riser. In practice, the comonomer content may be controlled in order to obtain the desired final density of polyethylene. In the riser of step b) the hydrogen/ethylene molar ratio is in the range of 0.1 to 0.5 and the ethylene concentration is between 5 and 15% by volume based on the total volume of gas present in the riser. The rest is propane or other inert gases.

More details on the above described polymerization process are provided in WIPO Pat. App. Pub. No. WO9412568.

EXAMPLES

The following examples are given to illustrate, without limiting, the present disclosure.

Unless differently stated, the following test methods are used to determine the properties reported in the detailed description and in the examples.

Density

Determined according to ISO 1183 at 23° C.

Molecular Weight Distribution Determination

The determination of the molar mass distributions and the means Mn, Mw and Mw/Mn derived therefrom were carried out by high-temperature gel permeation chromatography using a method described in the ISO 16014-1, -2, -4, issues of 2003. The specifics according to the ISO standards are as follows: solvent: 1,2,4-trichlorobenzene (TCB), temperature of apparatus and solutions: 135° C. and as the concentration detector a PolymerChar (Valencia, Paterna 46980, Spain) IR-4 infrared detector, capable for use with TCB. A WATERS Alliance 2000 equipped with the following pre-column SHODEX UT-G and separation columns: SHODEX UT 806 M (3×) and SHODEX UT 807 (Showa Denko Europe GmbH, Konrad-Zuse-Platz 4, 81829 Muenchen, Germany), connected in series was used. The solvent was vacuum distilled under nitrogen and was stabilized with 0.025% by weight of 2,6-di-tert-butyl-4-methylphenol. The flowrate used was 1 ml/min, the injection volume was 500 μl and polymer concentration was in the range of 0.01%<conc.<0.05% w/w. The molecular weight calibration was established by using monodispersed polystyrene (PS) standards from Polymer Laboratories (now Agilent Technologies, Herrenberger Str. 130, 71034 Boeblingen, Germany) in the range from 580 g/mol up to 11600000 g/mol and additionally with Hexadecane. The calibration curve was then adapted to Polyethylene (PE) by means of the Universal Calibration method (Benoit H., Rempp P. and Grubisic Z., in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim, Germany) respectively.

Shear-Induced Crystallization Test

This method is utilized to determine the onset time of shear-induced crystallization (SIC) of the polymer, $t_{onset,SIC}$. Samples are melt-pressed at 210° C., 4 min, under 200 bar in a lab press to 1 mm thick-plaques. Disc specimens are cut-out with a diameter of 25 mm. The samples are inserted in the plate-plate oscillatory-shear rheometer. A Physica MCR 301 rotational rheometer from AntonPaar is used.

The sample is then molten inside the test-geometry at 190° C. for 4 min, cooled down at a rate of ~10 K/min to the test temperature, T=125° C., and annealed for 5 min. Consequently, steady-shear under constant shear rate is applied and the shear viscosity is monitored as a function of time. The experiment is repeated, applying each time a different shear-rate ranging from 0.05 to 0.5 $s^{-1}$. The onset time for SIC, $t_{onset,SIC}$, is taken at the point where the viscosity has increased at 50% of its steady-state value (η) at 125° C. The steady-state value is the average of the steady-shear melt viscosity measured at the specific temperature.

The plot of log $t_{onset,SIC}$ vs. log shear-rate provides a linear function (of type y=Ax+B) which is extrapolated to a shear rate of 1000 $s^{-1}$ (process-relevant) to determine the value of $t_{onset,SIC}$@1000.

The SIC Index is then calculated according to the following relation:

$$\text{SIC Index} = (t_{onset,SIC}@1000 \times t_{onset,quiescent}) / ((\text{HLMI})*100)$$

The $t_{onset,\ quiescent}$ (in sec) is the crystallization onset at temperature of 125° C. under quiescent conditions, i.e. no shear, measured in isothermal mode in a differential-scanning-calorimetry apparatus, DSC, as hereinafter explained.

HLMI is the melt flow index (g/10 min) measured at T=190° C. with 21.6 kg load, according to ISO 1133.

The same protocol is described in the following documents.

I. Vittorias, *Correlation among structure, processing and product properties*, Würzburger Tage 2010, Wolfgang Kunze TA Instruments, Germany.

Wo D L, Tanner R I (2010), *The impact of blue organic and inorganic pigments on the crystallization and rheological properties of isotactic polypropylene*, Rheol. Acta 49, 75.

Derakhshandeh M., Hatzikiriakos S. G., *Flow-induced crystallization of high-density polyethylene: the effects of shear and uniaxial extension*, Rheol. Acta, 51, 315-327, 2012.

Isothermal DSC

The $t_{onset,quiescent}$, the onset time when no deformation is applied at 125° C., is determined by the iso-DSC (isothermal Differential Scanning Calorimetry) method. It is measured at 125° C. in a TA Instruments Q2000 DSC apparatus. The determination of the $t_{onset,quiescent}$ is performed utilizing the commercially available software TA Universal Analysis 2000. The sample preparation and set-up follows the DIN EN ISO 11357-1:2009 and ISO 11357-3:1999.

Melt Flow Index

Determined according to ISO 1133 at 190° C. with the specified load.

Long Chain Branching Index (LCB)

The LCB index corresponds to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The parameter g' is the ratio of the measured mean square radius of gyration to that of a linear polymer having the same molecular weight. Linear molecules show a g' ratio of 1, while values less than 1 indicate the presence of LCB. Values of g' as a function of mol. weight, M, were calculated from the equation:

$$g'(M) = <Rg^2>_{sample,M} / <Rg^2>_{linear\ ref.,M}$$

where $<Rg^2>,M$ is the root-mean-square radius of gyration for the fraction of mol. weight M.

The radius of gyration for each fraction eluted from the GPC (as described above but with a flow-rate of 0.6 ml/min and a column packed with 30 µm particles) is measured by analyzing the light scattering at different angles. From this MALLS setup it is possible to determine the mol. weight M and $<Rg^2>_{sample,M}$ and to define a g' at a measured $M=10^6$ g/mol. The $<Rg^2>_{linear\ ref,M}$ is calculated by the established relation between radius-of-gyration and molecular weight for a linear polymer in solution (Zimm and Stockmayer W H 1949)) and confirmed by measuring a linear PE reference with the same apparatus and methodology described herein.

The same protocol is described in the following documents:

Zimm B H, Stockmayer W H (1949) *The dimensions of chain molecules containing branches and rings*. J Chem Phys 17.

Rubinstein M., Colby R H. (2003), *Polymer Physics*, Oxford University Press.

Comonomer Content

The comonomer content is determined by means of IR in accordance with ASTM D 6248 98, using an FT-IR spectrometer Tensor 27 from Bruker, calibrated with a chemometric model for determining ethyl or butyl side-chains in PE for butene or hexene as the comonomer, respectively.

Swell Ratio

The swell-ratio of the polymers is measured utilizing a capillary rheometer, Göttfert Rheotester2000 and Rheograph25, at T=190° C., equipped with a commercial 30/2/2/20 die (total length 30 mm, Active length=2 mm, diameter=2 mm, L/D=2/2 and 20° entrance angle) and an optical device (laser-diode from Göttfert) for measuring the extruded strand thickness. The sample is molten in the capillary barrel at 190° C. for 6 min and extruded with a piston velocity corresponding to a resulting shear-rate at the die of 1440 $s^{-1}$. The extrudate is cut (by an automatic cutting device from Göttfert) at a distance of 150 mm from the die-exit, at the moment the piston reaches a position of 96 mm from the die-inlet. The extrudate diameter is measured as a function of time with the laser-diode at a distance of 78 mm from the die-exit. The maximum value corresponds to the $D_{extrudate}$. The swell-ratio is determined from the calculation: $SR=(D_{extrudate}-D_{die})100\%/D_{die}$ where $D_{die}$ is the corresponding diameter at the die exit, measured with the laser-diod.

Shrinkage@1500 $s^{-1}$ (Shrinkage Lab-Test)

This method is applied in order to determine the shrinkage of the final product of polyethylene after the melt-extrusion, or in other words the dimension stability potential of a grade. The method is recommended for homogeneous PE in granulate form. Samples in powder can be measured, but only after stabilizing and melt-homogenization (typically in a lab-plasticizer-kneader). However, in the latter case, one may observe a significant effect on the results, mainly due to the fact that the sample being more sensitive to degradation and air-bubbles in the extrudate.

The samples in granulate form can be used directly and approximately 20 g of sample are needed for filling the capillary barrel. The utilized capillary rheometer is a Göttfert Rheotester 2000, with a 15 mm diameter barrel and applicable pressure range 0-2000 bar, temperatures 25-400° C., equipped with a 30/2/2/20 die, with total length 30 mm, L/D=2/2 and 20° entrance angle. The recommended test temperature for polyethylene is 210° C.

The piston speed is set in order to have the required apparent shear rate at the die exit. The test is performed at shear rates 50 $s^{-1}$, 1000 $s^{-1}$, 1500 $s^{-1}$ and 2500 $s^{-1}$.

The extrudate is marked and pieces of 40 mm length are punched/stamped, while still in the molten-state, and left to cool at room temperature. At least 3 parts of 40 mm are marked in this way. A pinch-off metal tool is utilized to stamp the extrudate after the die-exit in the parts to be measured, with a length of 40 mm (initial length for each part, $L_{i,0}$) and typical width of 10 mm.

The whole extrudate is cut and left on a lab table to crystallize and cool down to room temperature for at least 15 min. The parts are cut at the marks and measured in length. The resulting length, $L_i$, in mm is recorded for each part i and averaged for 4 parts.

$$Shrinkage_i = \frac{L_0 - L_i}{L_0} \times 100\% = \frac{\Delta L_i}{L_0} \times 100\%$$

$$Shrinkage_{average} = \frac{\sum Shrinkage_i}{i}$$

The procedure is undertaken for each applied shear-rate and the measurement of shrinkage for each shear-rate is repeated at least two times.

Remark:

Deviations of the shrinkage along the extrudate length are expected, i.e. due to varying cooling time after exiting the die for each part and sagging (the punched part leaving the die last will be less time exposed to room temperature and "stretched" due to the extrudate weight).

Critical Shear Rate for Sharkskin (Sharkskin Test)

The sharkskin test is a method used to quantify the flow-instabilities and surface defects occurring during the extrusion of polymer melts. Specifically, the commercial sharkskin option with the Rheotester2000 capillary rheometer from Göttfert is used. The sharkskin option is a slit-die of 30×3×0.3 mm with three pressure transducers distributed along the die (at die-entry, middle and before die-exit). The pressure is recorded and analyzed (using Fourier-transformation) using commercially available Göttfert WebRheo software.

The polymer is extruded at 190° C. applying the following shear-rates in this specific order: 100-150-200-250-300-350-400-450-500 $s^{-1}$. The extrudate is then visually inspected for surface defects. The critical shear-rate for sharkskin instability is the applied shear-rate for which the sharkskin instability first occurs (high frequency pressure oscillations and visually detectable periodic surface distortions).

The same protocol is described in the following documents:

Palza H., Naue I. F. C., Wilhelm M., Filipe S., Becker A., Sunder J., Göttfert A., *On-Line Detection of Polymer Melt Flow Instabilities in a Capillary Rheometer*, KGK. Kautschuk, Gummi, Kunststoffe, 2010, vol. 63, no. 10, pp. 456-461.

Susana Filipe, Iakovos Vittorias, Manfred Wilhelm, *Experimental Correlation between Mechanical Non-Linearity in LAOS Flow and Capillary Flow Instabilities for Linear and Branched Commercial Polyethylenes*, Macromol. Mat. and Eng., vol. 293, no. 1, pp. 57-65 (2008).

Göttfert, A.; Sunder, J., AIP Conference Proceedings, vol. 1027, pp. 1195-1197 (2008).

Notched Tensile Impact Test

The tensile-impact strength is determined using ISO 8256:2004 with type 1 double notched specimens according to method A. The test specimens (4×10×80 mm) are cut from a compression molded sheet which has been prepared according ISO 1872-2 requirements (average cooling rate 15 K/min and high pressure during cooling phase). The test specimens are notched on two sides with a 45° V-notch. The depth of the notch is 2±0.1 mm and curvature radius on notch dip is 1.0±0.05 mm. The free length between grips is 30±2 mm. Before measurement, all test specimens are conditioned at a constant temperature of −30° C. over a period of from 2 to 3 hours. The procedure for measurements of tensile impact strength including energy correction following method A is described in ISO 8256.

Environmental Stress Cracking Resistance According to Full Notch Creep Test (FNCT)

The environmental stress cracking resistance of polymer samples is determined in accordance to international standard ISO 16770 (FNCT) in aqueous surfactant solution. From the polymer sample a compression molded 10 mm thick sheet has been prepared. The bars with squared cross section (10×10×100 mm) are notched using a razor blade on four sides perpendicularly to the stress direction. A notching device described in M. Fleissner in Kunststoffe 77 (1987), pp. 45 is used for the sharp notch, with a depth of 1.6 mm. The load applied is calculated from tensile force divided by the initial ligament area. The ligament area is defined as the remaining area=total cross-section area of specimen minus the notch area. For FNCT specimen: $10 \times 10$ mm$^2$−4 times of trapezoid notch area=46.24 mm$^2$ (the remaining cross-section for the failure process/crack propagation). The test specimen is loaded with standard condition suggested by the ISO 16770 with a constant load of 4 MPa at 80° C. in a 2% (by weight) water solution of non-ionic surfactant ARKOPAL N100. For accelerated FNCT conditions 5 MPa at 90° C. is applied in an aqueous solution of 2% by weight of ARKOPAL N100 and 5% of anionic surfactant GENAPOL Paste. The time until rupture of the test specimen is then detected.

Charpy aFM

Fracture toughness determination was performed by an internal method on test bars measuring 10×10×80 mm which had been sawn out of a compression molded sheet with a thickness of 10 mm. Six of these test bars are notched in the center using a razor blade in the notching device mentioned above for FNCT. The notch depth is 1.6 mm. The measurement is carried out using the Charpy measurement method in accordance with ISO 179-1, with modified test specimens and modified impact geometry (distance between supports). All test specimens are conditioned to the measurement temperature of 0° C. over a period of 2 to 3 hours. A test specimen is then placed without delay onto the support of a pendulum impact tester in accordance with ISO 179-1. The distance between the supports is 60 mm. The drop of a 2 J hammer is triggered, with the drop angle being set to 160°, the pendulum length to 225 mm and the impact velocity to 2.93 m/s. The fracture toughness value is expressed in kJ/m$^2$ and is given by the quotient of the impact energy consumed and the initial cross-sectional area at the notch, aFM. Only values for complete fracture and hinge fracture can be used here as the basis for a common meaning (see suggestion by ISO 179-1).

Example 1 and Comparative Examples 1-3

Process Setup

In Example 1 the process of the present disclosure was carried out under continuous conditions in a plant comprising two serially connected gas-phase reactors, as shown in FIG. 1.

Comparative Example 1 is carried out in the same plant under continuous conditions as well.

Example 1

The solid catalyst component was prepared as described in Example 13 of WIPO Pat. App. Pub. No. WO2004106388. The AcOEt/Ti molar ratio was 8.

Polymerization 7 g/h of the solid catalyst component prepared as described above were fed, using 5 kg/h of liquid propane, to a precontacting apparatus, in which triethylaluminum (TEA) and tetrahydrofuran (THF) were dosed. The weight ratio between aluminum alkyl and solid catalyst component was 6:1. The weight ratio between aluminum alkyl and THF was 44. The precontacting step was carried out under stirring at 50° C. with a total residence time of 70 minutes.

The catalyst enters the first gas-phase polymerization reactor 1 of FIG. 1 via line 10. In the first reactor ethylene was polymerized using H$_2$ as molecular weight regulator and in the presence of propane as inert diluent. 40 kg/h of ethylene and 50 g/h of hydrogen were fed to the first reactor via line 9. No comonomer was fed to the first reactor.

The polymerization was carried out at a temperature of 80° C. and at a pressure of 2.7 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 10 g/10 min and a density of 0.965 kg/dm$^3$.

The second reactor was operated under polymerization conditions of about 78° C., and a pressure of 2.5 MPa. 16 kg/h of ethylene and 0.30 kg/h of 1-hexene were introduced in the downcomer 33 of the second reactor via line 46. 5 kg/h of propane, 26.5 kg/h of ethylene and 8.5 g/h of hydrogen were fed through line 45 into the recycling system.

In order to broaden the molecular weight distribution of the final ethylene polymer, the second reactor was operated by establishing different conditions of monomers and hydrogen concentration within the riser 32 and the downcomer 33. This is achieved by feeding via line 52, 300 kg/h of a liquid stream (liquid barrier) into the upper part of the downcomer 33. The liquid stream has a composition different from that of the gas mixture present in the riser. =The different concentrations of monomers and hydrogen within the riser, the downcomer of the second reactor and the composition of the liquid barrier are indicated in Table 1. The liquid stream of line 52 comes from the condensation step in the condenser 49, at working conditions of 50° C. and 2.5 MPa, wherein a part of the recycle stream is cooled and partially condensed. As shown in the FIGURE, a separating vessel and a pump are placed, in the order, downstream of the condenser 49. The final polymer was discontinuously discharged via line 54.

The polymerization process in the second reactor produced relatively high molecular weight polyethylene fractions. In Table 1 the properties of the final product are specified. It can be seen that the melt index of the final product is decreased compared to the ethylene resin produced in the first reactor, showing the formation of high molecular weight fractions in the second reactor.

The first reactor produced around 48% by weight (split wt %) of the total amount of the final polyethylene resin produced by both the first and second reactors. At the same time, the obtained polymer is endowed with a relatively broad molecular weight distribution as witnessed by a ratio MIF/MIP equal to 24.

Comparative Example 1

The polymerization was carried out using the same setup of Example 1, but the polymerization catalyst was the same as used in Example 6 of WIPO Pat. App. Pub. No. WO2005019280.

8 g/h of the solid catalyst component prepared as described above were fed, using 5 kg/h of liquid propane, to a precontacting apparatus, in which triethylaluminum (TEA) and tetrahydrofuran (THF) were dosed. The weight ratio between the aluminum alkyl and solid catalyst component was 5:1. The weight ratio between aluminum alkyl and THF was 44. The precontacting step was carried out under stirring at 50° C. with a total residence time of 70 minutes.

The catalyst enters the first gas-phase polymerization reactor 1 of FIG. 1 via line 10. In the first reactor ethylene was polymerized using $H_2$ as a molecular weight regulator and in the presence of propane as an inert diluent. 40 kg/h of ethylene and 75 g/h of hydrogen were fed to the first reactor via line 9. No comonomer was fed to the first reactor.

The polymerization was carried out at a temperature of 80° C. and at a pressure of 2.4 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 100 g/10 min and a density of 0.968 kg/dm$^3$.

The second reactor was operated under polymerization conditions of about 80° C., and a pressure of 2.1 MPa. 12 kg/h of ethylene and 1.5 kg/h of 1-hexene were introduced in the downcomer 33 of the second reactor via line 46. 5 kg/h of propane, 26.5 kg/h of ethylene and 1.2 g/h of hydrogen were fed through line 45 into the recycling system.

In order to broaden the molecular weight distribution of the final ethylene polymer, the second reactor was operated by establishing different conditions of monomers and hydrogen concentration within the riser 32 and the downcomer 33. This is achieved by feeding via line 52, 200 kg/h of a liquid stream (liquid barrier) into the upper part of the downcomer 33. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 53° C. and 2.1 MPa, wherein a part of the recycle stream is cooled and partially condensed. As shown in the FIGURE, a separating vessel and a pump are placed, in the order, downstream pf the condenser 49. The final polymer was discontinuously discharged via line 54.

The polymerization process in the second reactor produced relatively high molecular weight polyethylene fractions. In Table 1 the properties of the final product are specified. It can be seen that the melt index of the final product is decreased as compared to the ethylene resin produced in the first reactor, showing the formation of high molecular weight fractions in the second reactor.

The first reactor produced around 50% by weight (split wt %) of the total amount of the final polyethylene resin produced by both first and second reactors. At the same time, the polymer is endowed with a relatively broad molecular weight distribution, with a ratio MIF/MIP equal to 38.8

Comparative Examples 2 and 3

The polymers of these comparative examples are prior art polyethylene compositions, prepared by operating in a continuous process in three slurry reactors arranged in series, in the presence of a catalyst comprising the reaction product of a magnesium alcoholate with $TiCl_4$, as described in WIPO Pat. App. Pub. No. WO91/18934. By setting different polymerization conditions in the three reactors, a relatively broad molecular weight distribution is obtained, as witnessed by a ratio MIF/MIP equal to about 21.

TABLE 1

|  | Ex. 1 | Comp. 1 | Comp. 2 | Comp. 3 |
|---|---|---|---|---|
| Operative conditions first reactor | | | | |
| $H_2/C_2H_4$ Molar ratio | 0.9 | 1.7 | | |
| $C_2H_4$% | 9.0 | 14 | | |
| Split (wt %) | 49 | 50 | | |
| Operative conditions second reactor | | | | |
| $H_2/C_2H_4$ Molar ratio riser | 0.287 | 0.038 | | |
| $C_2H_4$% riser | 9.5 | 15 | | |
| $C_6H_{12}$ riser | 0.02 | 1.2 | | |
| $H_2/C_2H_4$ Molar ratio downer | 0.078 | 0.04 | | |
| $C_2H_4$% downer | 1.1 | 5.4 | | |
| $C_6H_{12}$ downer | 0.13 | 2.2 | | |
| $H_2/C_2H_4$ Molar ratio barrier | 0.002 | 0.01 | | |
| $C_2H_4$% barrier | 4.5 | 6.5 | | |
| $C_6H_{12}$ barrier | 0.17 | 2.7 | | |
| Final Polymer properties | | | | |
| MIP [5 kg] (g/10 min.) | 0.19 | 0.21 | 0.35 | 0.34 |
| MIF [21.6 kg] (g/10 min.) | 4.6 | 8.15 | 7.3 | 7.0 |
| MIF/MIP | 24 | 38.8 | 20.85 | 20.59 |
| Density (kg/dm$^3$) | 0.955 | 0.9487 | 0.953 | 0.952 |
| Mw [g/mol] | 4.4E+5 | 3.6E+5 | 2.8E+5 | 2.7E+5 |
| Mz [g/mol] | 3.9E+6 | 5.0E+6 | 1.3E+6 | 1.5E+6 |

TABLE 1-continued

|  | Ex. 1 | Comp. 1 | Comp. 2 | Comp. 3 |
|---|---|---|---|---|
| Mw/Mn | 20 | 52 | 18 | 15 |
| LCB | 0.8 | 0.69 | 0.75 | 0.75 |
| Comonomer content IR [%] | 0.2% ± 0.05 ($C_6H_{12}$) | 1.6 ($C_6H_{12}$) | <0.8 ($C_4H_8$) | <0.8 ($C_4H_8$) |
| SIC index | 3.2 | 1.9 | 5.1 | 2.0 |
| Swell ratio (%) | 198 | 120 | 190 | 181 |
| Shrinkage@1500 1/s, T = 190° C. [%] | 16 | — | 19 | 20 |
| Critical shear-rate for sharkskin, T = 190° C., [1/s] | 300 | — | 100 | 100 |
| Notched-Tensile Impact test, T = −30° C. [kJ/m$^2$] | 165 | 93 | 20 | 126 |
| FNCT 4 MPa, 80° C. [hours]* | 42 | >2000 | 16 | 28 |
| FNCT 5 MPa, 90° C. [hours]** | 3.7 | 92.9 | 1.5 | 2.6 |

Notes:
$C_2H_4$ = ethylene;
$C_4H_8$ = butene;
$C_6H_{12}$ = hexene;
*aqueous solution of 2% Arkopal N100;
**aqueous solution of 5% Genapol Paste and 2% Arkopal N100

What is claimed is:

1. A polyethylene composition comprising:
   1) a density from 0.952 to 0.960 g/cm$^3$ as determined according to ISO 1183 at 23° C.;
   2) a MIF/MIP ratio from 17 to 30, wherein MIF is the melt flow index at 190° C. with a load of 21.60 kg, and MIP is the melt flow index at 190° C. with a load of 5 kg, both determined according to ISO 1133; and
   3) a SIC Index from 2.5 to 5.0;
   wherein the SIC Index is the Shear-Induced Crystallization Index, determined according to the following relation:

SIC Index=($(t_{onset,SIC}@1000 \times t_{onset,quiescent})/((HLMI)*100)$ where $t_{onset,SIC}@1000$ is measured in seconds and is the time required for crystallization onset under shear rate of 1000 s$^{-1}$, the $t_{onset,\ quiescent}$ is measured in seconds and is the crystallization onset time at temperature of 125° C. under no shear, determined in isothermal mode by differential scanning calorimetry; HLMI is the melt flow index determined at 190° C. with a load of 21.6 kg, according to ISO 1133.

2. The polyethylene composition of claim 1, comprising one or more ethylene copolymers.

3. The polyethylene composition of claim 2, containing 1% by weight or less of comonomer.

4. The polyethylene composition of claim 3, wherein the comonomer or comonomers present in the ethylene copolymers are selected from olefins having formula $CH_2$=CHR wherein R is an alkyl radical, linear or branched, having from 1 to 10 carbon atoms.

5. The polyethylene composition of claim 1, obtained by using a Ziegler-Natta polymerization catalyst.

6. The polyethylene composition of claim 1, having at least one of the following additional features:
   a Mw equal to or greater than 250000 g/mol;
   a Long Chain Branching index equal to or greater than 0.70;
   a MIP of 0.05-0.5 g/10 min.; and
   a MIF of 1-15 g/10 min.

7. The polyethylene composition of claim 1, comprising:
   A) 40-60% by weight of an ethylene homopolymer or copolymer with density equal to or greater than 0.960 g/cm$^3$ and melt flow index MIE at 190° C. with a load of 2.16 kg, according to ISO 1133, of 2-30 g/10 min.; and
   B) 40-60% by weight of an ethylene copolymer having a MIE value lower than the MIE value of A).

\* \* \* \* \*

UNITED STATES PATENT AND TRADEMARK OFFICE
CERTIFICATE OF CORRECTION

PATENT NO. : 9,512,308 B2
APPLICATION NO. : 15/140022
DATED : December 6, 2016
INVENTOR(S) : Iakovos Vittorias et al.

It is certified that error appears in the above-identified patent and that said Letters Patent is hereby corrected as shown below:

On the Title Page

| | | |
|---|---|---|
| Column 1, (30) | Line 1 | Delete "12189392" and insert --12189392.9-- |
| Column 1, (30) | Line 2 | Delete "12194526" and insert --12194526.5-- |

In the Specification

| | | |
|---|---|---|
| Column 2 | Line 13 | Before "measured", delete "an" |
| Column 2 | Line 25 | Delete "FIGURE" and insert --figure-- |
| Column 2 | Line 35 | Delete "FIGURE." and insert --figure.-- |
| Column 2 | Line 58 | Delete "Mw/Mn," and insert --$M_w/M_n$,-- |
| Column 2 | Line 58 | Delete "Mw" and insert --$M_w$-- |
| Column 2 | Line 59 | Delete "Mn" and insert --$M_n$-- |
| Column 2 | Line 62 | Delete "Mw/Mn" and insert --$M_w/M_n$-- |
| Column 3 | Line 1 | Delete "Mw" and insert --$M_w$-- |
| Column 3 | Line 18 | Delete "pentene-1,4-methylpentene-1," and insert --pentene-1, 4-methylpentene-1,-- |
| Column 4 | Line 39 | After "acids", insert --.-- |
| Column 4 | Line 59 | Delete "Ziegler-Nana" and insert --Ziegler-Natta-- |
| Column 5 | Line 41 | Delete "(100-130° C.)." and insert --(100 °C.-130 °C.).-- |
| Column 5 | Line 55 | Delete "50 and 150° C." and insert --50 °C. and 150 °C.-- |
| Column 6 | Line 6 | Delete "80-130° C." and insert --80 °C.-130 °C.-- |
| Column 6 | Line 29 | Delete "-10-150° C." and insert --10 °C.-150 °C.-- |
| Column 6 | Line 30 | Delete "0-120° C." and insert --0 °C.-120 °C.-- |
| Column 8 | Line 10 | Delete "50 and 120° C.," and insert --50 °C. and 120 °C.,-- |
| Column 8 | Line 10 | Delete "65 and 100° C." and insert --65 °C. and 100 °C.-- |
| Column 8 | Line 30 | Delete "65 to 95° C.," and insert --65 °C. to 95 °C.,-- |
| Column 9 | Line 30 | Delete "Mn, Mw and Mw/Mn" and insert --$M_n$, $M_w$ and $M_w/M_n$-- |
| Column 9 | Line 56 | Delete "Mark-Houwing" and insert --Mark-Houwink-- |

Signed and Sealed this
Twenty-sixth Day of February, 2019

Andrei Iancu
*Director of the United States Patent and Trademark Office*

CERTIFICATE OF CORRECTION (continued)
U.S. Pat. No. 9,512,308 B2

| Column 10 | Line 15 | Delete "log t$_{onset,SIC}$" and insert --logt$_{onset,SIC}$-- |
| Column 11 | Line 64 | Delete "25-400° C.," and insert --25 °C.-400 °C.,-- |
| Column 13 | Line 36 | Delete "Charpv" and insert --Charpy-- |
| Column 14 | Line 54 | Delete "FIGURE," and insert --figure,-- |
| Column 16 | Line 13 | Delete "FIGURE," and insert --figure,-- |
| Column 16 | Line 14 | Delete "pf" and insert --of-- |
| Column 16 | Line 28 | After "38.8", insert --.-- |
| Column 17 | Line 2 | Delete "Mw/Mn" and insert --M$_w$/M$_n$-- |

In the Claims

| Column 18 | Line 32 | In Claim 6, delete "Mw" and insert --M$_w$-- |